United States Patent [19]

Wheadon et al.

[11] 4,345,197
[45] Aug. 17, 1982

[54] VEHICLE BATTERY CHARGING SYSTEM

[75] Inventors: Ellis G. Wheadon, Anderson; Robert J. Nowakowski, Indianapolis, both of Ind.

[73] Assignee: General Motors Corporation, Detroit, Mich.

[21] Appl. No.: 126,532

[22] Filed: Mar. 3, 1980

[51] Int. Cl.³ ............................................. H02J 7/14
[52] U.S. Cl. ...................................... 320/6; 320/8; 320/15; 320/61
[58] Field of Search ...................................... 320/6–8, 320/15, 61; 322/25, 28, 35

[56] References Cited

U.S. PATENT DOCUMENTS

| | | | |
|---|---|---|---|
| 979,155 | 12/1910 | Gugler | 320/6 X |
| 1,954,563 | 4/1934 | Malaussene | 322/35 X |
| 2,564,957 | 8/1951 | Cermak | 320/8 X |
| 3,129,372 | 4/1964 | Warren | 320/15 |
| 3,631,257 | 12/1971 | Behr et al. | 307/66 |
| 3,763,415 | 10/1973 | Ownby | 320/61 X |
| 3,845,835 | 11/1974 | Petit | 320/61 X |
| 4,044,268 | 8/1977 | Hammel et al. | 307/66 |

*Primary Examiner*—Robert J. Hickey
*Attorney, Agent, or Firm*—Mark A. Navarre

[57] ABSTRACT

The output voltage of an engine-driven generator is varied in accordance with engine vacuum in a manner to increase the charging rate during deceleration of the vehicle and to decrease the charging rate during acceleration of the vehicle. The charging current developed in the generator is alternately applied to one or the other of two storage batteries while the other storage battery is connected to supply power to the various electrical loads of the vehicle. A switching circuit responsive to the terminal voltage of the battery connected to supply power to the loads operates to exchange the battery connections when the voltage supplied to the loads decreases below a reference value so that the depleted battery is connected to be charged by the generator and the charged battery is connected to supply power to the loads.

6 Claims, 3 Drawing Figures

VEHICLE BATTERY CHARGING SYSTEM

This invention relates to a motor vehicle electrical system wherein the voltage regulated output of an engine-driven generator supplies charging current to vehicle storage batteries which in turn supply power to the various electrical loads of the vehicle.

Present day motor vehicle electrical systems typically comprise an electrical generator for charging a storage battery and for supplying power to the various electrical loads. The term "generator" as used herein, generically refers to a mechanically driven source of direct current, such as a rectified alternating current generator or a direct current generator. The output of the generator is controlled by a voltage regulator which varies the excitation of the generator field winding to maintain the system voltage at a desired level.

A shortcoming of the above-described system is that the generator output is regulated independently of various vehicle operating conditions, with the possible exception of battery temperature. More specifically, the load that the generator places upon the engine is independent of the engine power demand dictated by the operator of the vehicle. For example, the generator load may be the same in a closed throttle deceleration situation as in a wide-open throttle acceleration situation. As a result, the performance of the vehicle is impaired under acceleration and the momentum of the vehicle is wasted furing deceleration.

Another shortcoming of a conventional motor vehicle electrical system is that the voltage supplied to the electrical loads of the vehicle varies over a wide range. For example, a nominal 12-volt supply voltage may be increased to nearly 15 volts during cold temperature operation, and decreased to less than 7 volts during engine cranking. Consequently, the various electrical loads must be specially designed to accommodate such a wide variation in supply voltage. Moreover, operating the electrical loads at a voltage exceeding the nominal system voltage results in excessive energy consumption in the loads.

A further shortcoming of a conventional motor vehicle electrical system is that the operator of the vehicle may inadvertently leave an electrical load energized after turning off the engine, thereby discharging the storage battery to such a degree that it is inoperative to crank the engine when so desired.

Accordingly, it is an object of this invention to provide an improved motor vehicle electrical system wherein the engine drives a generator for battery charging and wherein the output voltage of the generator is regulated in accordance with engine load in a manner to take advantage of the momentum of the vehicle during deceleration and to improve engine performance during acceleration.

It is another object of this invention to provide an improved motor vehicle electrical system wherein the voltage supplied to the various electrical loads of the vehicle is maintained substantially constant even during engine cranking.

It is another object of this invention to provide an improved motor vehicle electrical system wherein the voltage supplied to the various electrical loads of the vehicle is maintained at substantially the nominal system voltage to prevent excessive energy consumption in the loads.

It is another object of this invention to provide an improved motor vehicle electrical system having separate storage batteries for engine cranking and accessory load functions wherein the batteries are designed to best serve their respective functions.

it is a further object of this invention to provide an improved motor vehicle electrical system having at least two storage batteries wherein electrical switching means are actuated to alternately connect the batteries for charging and discharging and wherein the batteries remain operably connected to the generator and to the electrical loads despite an electrical failure that disables the switching means.

These objects are carried forward by providing two storage batteries for supplying power to the various electrical loads of the vehicle. The two batteries are alternately charged and discharged as a function of the voltage supplied to the electrical loads so that at any instant one of the batteries is connected to supply power to the loads and the other is connected to a battery charging circuit supplied by an engine-driven generator. The output voltage of the generator and hence the charging current supplied to the batteries is varied as a function of the engine load so that during acceleration of the vehicle, the battery i charged at a slow rate and during deceleration of the vehicle, the battery is charged at a high rate. According to a first embodiment, one of the batteries is reserved for supplying power to the engine cranking motor and the other battery supplies power to certain of the electrical loads when the vehicle is not being operated. According to a second embodiment, both of the batteries are used solely for accessory loads and a third battery is provided for supplying power to the engine cranking motor.

IN THE DRAWINGS

Figure 1:
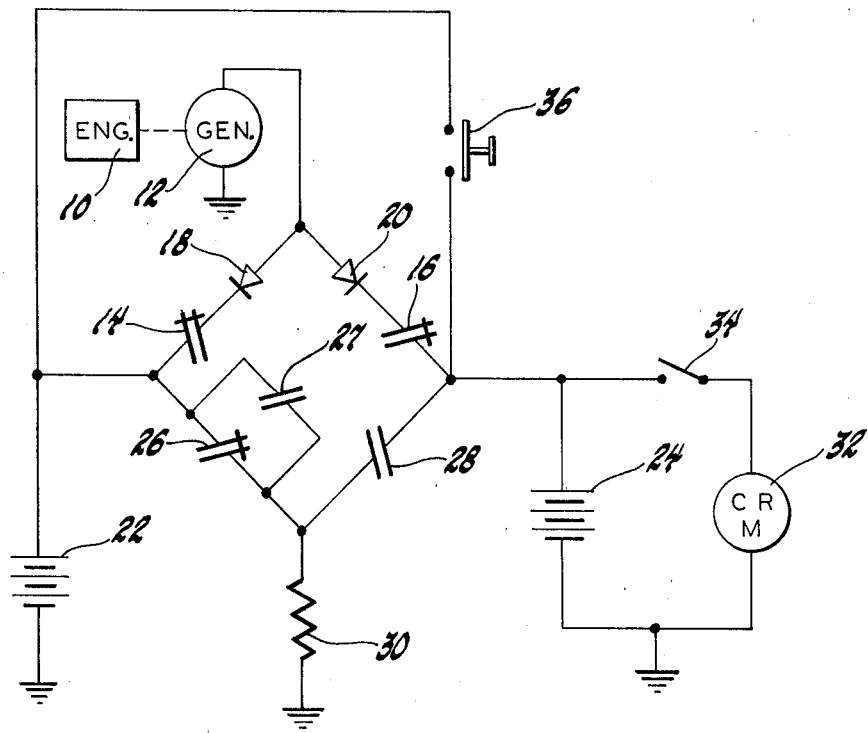
FIG. 1 is a circuit diagram of a two-battery vehicular electrical system made in accordance with this invention.

Referring now to FIG. 1, internal combustion engine 10 is connected to drive electric generator 12, and the electrical power thereby developed, is used to charge vehicular storage batteries 22 and 24. Contact pairs 14 and 16 may be selectively actuated during the operation of engine 10 to supply charging current from generator 12 through diodes 18 or 20 to storage batteries 22 or 24. Contact pairs 26 and 28 may be selectively actuated to connect either storage battery 22 or storage battery 24 to supply power to the various accessory electrical loads of the vehicle, designated by reference numberal 30. Contact pair 27 is connected in parallel with contact pair 26, and acts to prevent interruption of power to electrical loads 30 when the various contacts are actuated as will be later described. Engine cranking motor 32 is connected through cranking switch 34 to the positive terminal of storage battery 24. Contact pairs 14, 16 and 26 are normally closed and contact pairs 27 and 28 are normally open as indicated so that when engine 10 is not in operation, storage battery 22 is connected to supply power to electrical loads 30 through contact pair 26, and storage battery 24 is available to supply power to engine cranking motor 32 through cranking switch 34. Diodes 18 and 20 operate to prevent batteries 22 and 24 from supplying current to each other or to the windings of generator 12. Switch 36 is normally open but may be closed to connect batteries 22 and 24 in parallel in order to provide additional cranking power if necessary.

When engine 10 is running, a switching circuit (described in reference to FIG. 3) controls the actuation of contact pairs 14, 16, 26, 27 and 28 in a manner to alternately charge and discharge storage batteries 22 and 24. Contact pairs 14 and 27 are controlled by a first branch of the switching circuit and contact pairs 16, 26 and 28 are controlled by a second branch of the switching circuit, the two branches being alternately energized as a function of the terminal voltages of batteries 22 and 24. When the first branch is energized, contact pair 14 opens and contact pair 27 closes so that generator 12 is connected to supply charging current to battery 24, and battery 22 is connected to supply power to electrical loads 30. When the second branch is energized, contact pairs 16 and 26 open and contact pair 28 closes so that generator 12 is connected to supply charging current to battery 22, and battery 24 is connected to supply power to electrical loads 30. In either case, the battery connected to supply power to loads 30 is disconnected from generator 12 and the battery receiving charging current from generator 12 is disconnected from loads 30. As will be later described, the circuit branch energization is controlled in accordance with the terminal voltage of the battery connected to supply power to electrical loads 30. When this terminal voltage drops below a reference value indicative of a discharged battery, the switching circuit changes state so that the depleted battery is connected to be charged by generator 12 and the charged battery is connected to supply power to electrical loads 30. As a result, generator 12 is not directly connected to electrical loads 30, and its output voltage (and hence, the charging rate) is limited only by the internal specifications of the storage batteries. Moreover, the voltage supplied to electrical loads 30 varies only over a range defined by the nominal terminal voltage of storage batteries 22 and 24 and the reference value used to change the state of the switching circuit.

Figure 2:
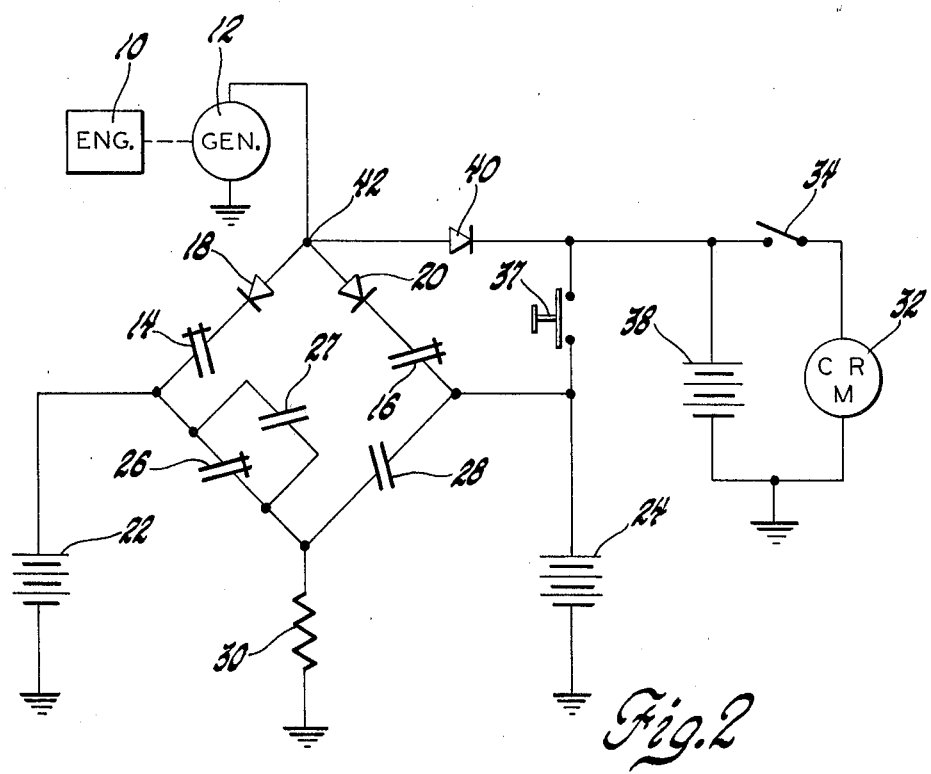
FIG. 2 is a circuit diagram of a three-battery vehicular electrical system made in accordance with this invention.

FIG. 2 is a circuit for implementing a second embodiment of this invention. Circuit elements corresponding to those described in reference to FIG. 1 have been assigned the same reference numerals. For this embodiment a third storage battery designated by reference numeral 38 is provided for supplying power to engine cranking motor 32 when switch 34 is closed. Charging current for battery 38 is supplied from generator 12 through diode 40, the anode of which is connected to terminal 42. Since battery 38 is used exclusively for supplying power to engine cranking motor 32, its internal construction may be designed to best serve that sort of load. That is, battery 38 may be a shallow discharge battery having large surface area, low density grids and plates so that it is best suited for supplying loads having short duration, large peak power requirements. Batteries 22 and 24 are alternately charged and discharged in the manner described in reference to FIG. 1. In the second embodiment, however, batteries 22 and 24 supply power only to accessory loads 30, not to engine cranking motor 32. As a result, batteries 22 and 24 may be designed specifically to best serve accessory-type loads. That is, batteries 22 and 24 may be deep discharge batteries having small surface area, high density grids and plates, so as to be best suited for supplying loads having long duration, low peak power requirements.

In a manner analogous to switch 36 in FIG. 1, switch 37 may be actuated to connect battery 24 in parallel with cranking battery 38 in order to provide additional power for cranking motor 32 if desired.

The arrangement of contact pairs 14, 16, 26, 27 and 28 depicted in FIGS. 1 and 2 contributes to a favorable failure mode in the event that the switching circuit (to be described in reference to FIG. 3) becomes inoperative to actuate the contacts. If a failure of this nature occurs, generator 12 is still connected to charge each of the batteries, and battery 22 remains connected to supply power to the various electrical loads 30.

Figure 3:
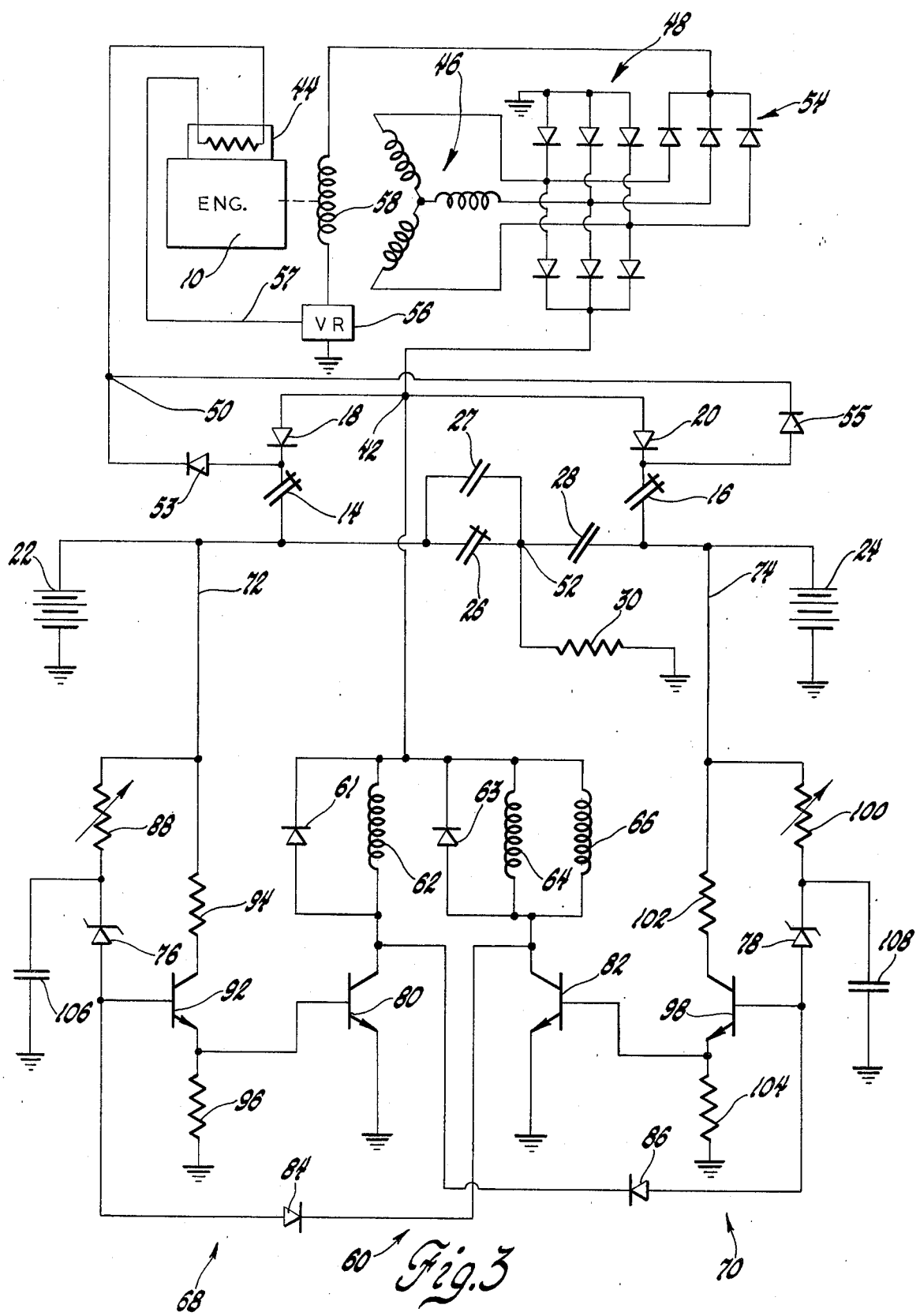
FIG. 3 is a more specific circuit diagram of the vehicle electrical system, illustrating the generator voltage control means and the battery charging circuitry.

FIG. 3 specifically illustrates the generator voltage control circuit and the switching circuit mentioned in reference to FIGS. 1 and 2. Circuit elements corresponding to those described in reference to FIGS. 1 and 2 have been assigned the same reference numerals. Vacuum transducer 44 is represented as an electrical resistor, the resistivity of which varies as a function of the pressure to which it is subjected. Accordingly, transducer 44 is located relative to engine 10 in a manner to sense the engine vacuum. A transducer that satisfies the above specifications is the model #45154 BE-A-1.47-75 vacuum potentiometer, manufactured by Giannini Corporation, Pasadena, Calif. If for some reason (if engine 10 is a diesel engine, for example), a vacuum signal may not be easily obtained, a throttle or accelerator pedal position transducer may be used in lieu of transducer 44. A high value of engine vacuum corresponding to a deceleration situation serves to increase the resistivity of transducer 44, and a low value of engine vacuum corresponding to an acceleration situation serves to decrease the resistivity of transducer 44.

In order to disclose the manner by which the charging rate is varied, generator 12 is specifically depicted as an alternator having an engine-driven field winding 58 and a WYE-connected stator winding 46. The alternating current developed in stator windings 46 is converted to direct current by bridge rectifier 48, the output of which is connected to terminal 42 for supplying charging current to the batteries. Diode trio 54 provides a source of current for energizing field winding 58. Voltage regulator 56 is depicted in block diagram form since it operates in a well known manner to vary the excitation of generator field winding 58 in accordance with the voltage applied to sense lead 57. As the voltage applied to lead 57 increases, voltage regulator 56 serves to decrease the excitation of field winding 58, thereby decreasing the output voltage developed in stator windings 46. If, on the other hand, the voltage applied to lead 57 decreases, voltage regulator 56 serves to increase the excitation of field winding 58, thereby increasing the output voltage developed in stator windings 46. A voltage regulator that satisfies the above specifications is disclosed in the U.S. Patent to Harland, Jr. et al U.S. Pat. No. 3,539,864.

Diodes 53 and 55, and transducer 44 are connected in a manner to provide a control voltage for sense lead 57 of voltage regulator 56. The anodes of diodes 53 and 55 are connected to the cathodes of diodes 18 and 20 respectively. The cathodes of diodes 53 and 55 are connected together at terminal 50, and transducer 44 is connected between terminal 50 and sense lead 57. In operation, diodes 53 and 55 serve to develop a voltage potential at terminal 50 that corresponds to the terminal voltage of the battery 22 or 24 having the highest terminal voltage (that is, the output voltage of generator 12). From the foregoing, it may be seen that the output voltage of generator 12 and hence the charging rate for the batteries is controlled as a function of the engine vacuum or load as sensed by vacuum transducer 44. Specifically, a high engine vacuum corresponding to a deceleration situation increases the resistivity of transducer 44 to decrease the voltage potential applied to sense lead 57 of voltage regulator 56, thereby increasing the excitation of field winding 58 to increase the output voltage of generator 12. On the other hand, a low engine vacuum signal corresponding to an acceleration situation decreases the resistivity of transducer 44 to increase the voltage potential applied to sense lead 57, thereby decreasing the excitation of field winding 58 to decrease the output voltage of generator 12. The range over which the output voltage of generator 12 may be varied is a function of the resistance range of transducer 44 and the component values within voltage regulator 56. According to the preferred embodiment of this invention, these values are specified so that a high engine vacuum signal corresponding to a deceleration situation results in the maximum charging current suitable for the batteries and so that a low vacuum signal corresponding to an acceleration situation results in a very low generator output voltage for only trickle charging the batteries. Vacuum signals intermediate to the two extreme signals referred to above result in various generator output voltages on a linear or nonlinear scale as desired. It will be appreciated that the voltage applied to sense lead 57 may be varied as a function of other parameters as well, including battery temperature.

Although FIG. 3 does not specifically depict engine cranking motor 32 or its energization path, it may be connected as shown in either FIG. 1 or FIG. 2, depending upon whether a two-battery or a three-battery system is desired. For the two-battery embodiment, cranking motor 32 and crank switch 34 are serially connected in parallel to battery 24 as shown in FIG. 1. For the three-battery design, the anode of diode 40 is connected to terminal 42 as shown in FIG. 2. For the purpose of clarity, switches 36 or 37 are also not shown in FIG. 3.

Reference numeral 60 generally designates the switching circuit for controlling the actuation of contact pairs 14, 16, 26, 27, and 28 as mentioned in reference to FIGS. 1 and 2. The switches are illustrated in the form of relays, wherein coil 62 is selectively energized to control the actuation of contact pairs 14 and 27, coil 64 is selectively energized to control the actuation of contact pairs 16 and 28, and coil 66 is selectively energized to control the actuation of contact pair 26. When any of the coils are energized, the contact pair associated with that coil assumes a state opposite to its normal state indicated in FIGS. 1-3. For example, when coil 66 is energized, contact pair 26 changes from its normally closed state to an open state, and switches back to its normally closed state when coil 66 is deenergized. A first branch of the circuit generally designated by reference numeral 68 controls the energization of coil 62 in response to the terminal voltage of battery 22, and a second branch generally designated by reference numeral 70 controls the energization of coils 64 and 66 in response to the terminal voltage of battery 24. Branches 68 and 70 each comprise a voltage sensing lead 72 or 74 connected to the positive terminal of batteries 22 and 24 respectively, a Zener diode 76 or 78, and a power transistor 80 or 82. Transistor 80 is biased on and off to control the energization of coil 62 and transistor 82 is biased on and off to control the energization of coils 64 and 66. When engine 10 is running, transistors 80 and 82 assume opposite states of conductivity so that either coil 62 is energized, or alternately, coils 64 and 66 are energized. The battery associated with the transistor 80 or 82 that is biased to a conductive state is connected through contact pairs 26 or 28 to supply power to the electrical loads 30 and is disconnected from generator 12. The battery associated with the transistor 80 or 82 that is biased to a nonconductive state is connected to be charged by generator 12 through contact pairs 14 or 16 and is disconnected from electrical loads 30. Diodes 84 and 86 prevent simultaneous conduction of transistors 80 and 82 in a manner that will be described in reference to the remainder of the switching circuit, and diodes 61 and 63 operate in a well known manner to protect transistors 80 and 82 from inductive transient voltages associated with turning off transistors 80 or 82.

Zener diodes 76 and 78 are poled in a manner to sense the terminal voltage of batteries 22 and 24 respectively relative to the Zener breakdown voltage. When the respective battery voltage exceeds the breakdown voltage, the Zener diodes 76 and/or 78 become conductive. When the voltage drops across Zener diode 76 and resistor 88 exceeds the junction potential of transistor 92, transistor 92 becomes conductive allowing a current to flow from storage battery 22 through biasing resistor 94, the emitter-collector circuit of transistor 92 and biasing resistor 96. Similarly, transistor 98 is rendered conductive when the voltage drop across Zener diode 78 and resistor 100 exceeds the junction potential of that transistor, allowing current to flow from battery 24 through biasing resistor 102, the emitter-collector circuit of transistor 98 and biasing resistor 104. When conductive, transistors 92 and 98 tend to bias transistors 80 and 82 conductive respectively. However, diodes 84 and 86 operate in response to the conduction of transistors 82 and 80 to remove the bias current from the transistor 92 or 98 associated with the other power transistor 80 or 82. Specifically, diode 84 operates to conduct away the bias current for transistor 92 when transistor 82 becomes conductive. Similarly, diode 86 operates to conduct away the bias current for transistor 98 when transistor 80 becomes conductive. The operation of the switching circuit thus resembles that of a flip-flop device wherein the circuit cannot change states until the terminal voltage of the battery 22 or 24 associated with the conducting transistor 80 or 82 drops below that required to maintain transistor 92 or 98 conductive. That voltage (hereinafter referred to as the switching voltage) is preferably about 0.5 volt below the nominal terminal voltage of batteries 22 and 24. Resistors 88 and 100 may be variable as shown in order to adjust the switching voltage. Capacitors 106 and 108 operate to filter the voltage appearing on sense leads 72 and 74 so that extraneous voltage transients will not cause the switching circuit to change states prematurely.

As indicated earlier, contact pair 27 operates to prevent the interruption of the power supplied to electrical loads 30 when switching circuit 60 changes state. Although the power interruption that would otherwise occur at the switching voltage is relatively short in duration (about 10 msec) such an interruption might adversely affect the operation of certain electronic circuits, particularly semiconductor read-write memory devices. Although a variety of circuit configurations may be used to prevent such an interruption, the preferred embodiment takes the form of an additional contact pair 27 connected in parallel to contact pair 26 as indicated earlier. The state of contact pair 27 is controlled in accordance with the energization of coil 62, the contacts 27 being normally open. Each of the switches are of the type wherein a spring biases a movable contactor (not shown) into engagement with a first pair of contacts, such as contact pair 14. A coil such as coil 62 is selectively energized to shift the contactor out of engagement with the first contact pair and into engagement with a second contact pair, such as contact pair 27. When the coil is deenergized, the spring returns the contactor to its original position, engaging the first pair of contacts. The relay switches are further characterized in that the time required for deenergization is longer than the time required for energization. For example, the closing time for a normally-closed contact pair will be longer than its opening time. This switching characteristic in combination with the connection of contact pair 27 in parallel with contact pair 26 prevents an interruption of power to loads 30 when switching circuit 60 changes state. Switches of this type are readily available, either over-the-counter, or by specification.

The operation of the circuit will now be described in detail. When engine 10 is not being operated, battery 22 is connected through contact pair 26 to supply power to electrical loads 30. Transistors 92 and 98 may be conductive if the terminal voltage of battery 22 or 24 respectively exceeds the switching voltage. The current drain through transistors 92 or 98 is slight, however, and will not prematurely discharge either battery. Transistors 80 and 82, however, cannot become conductive to energize coils 62, 64 or 66 since generator 12 develops no output voltage when engine 10 is not operating. When engine 10 is started, generator 12 develops an output voltage in accordance with the engine vacuum and enables either transistor 80 or 82 to become conductive. At the same time, batteries 22 and 24 are charged from the output voltage of generator 12 through normally closed contact pairs 14 and 16 respectively. The transistor 80 or 82 associated with the battery 22 or 24 having the highest terminal voltage will become biased conductive first, and the diode 84 or 86 having its cathode connected to the collector of that transistor will prevent the transistors 80 and 92 or 82 and 98 from becoming conductive. Assuming that transistor 80 becomes conductive first, diode 86 holds the base of transistor 98 at substantially ground potential so that circuit branch 70 cannot be energized. Coil 62 is energized through a circuit comprising generator 12, coil 62, and the collector-emitter circuit of transistor 80, causing contacts 14 to open and contacts 27 to close. In this situation, battery 22 is connected to supply power to loads 30 through contact pairs 26 and 27 and battery 24 is connected to be charged by generator 12 through contacts 16 at a rate determined in accordance with the engine vacuum. This mode of operation continues until battery 22 is sufficiently discharged so that its terminal voltage falls below the switching voltage. At that point, transistor 80 becomes nonconductive to deenergize coil 62, and transistor 82 becomes conductive to energize coils 64 and 66 through a path comprising generator 12, coil 64 and 66, and the collector-emitter circuit of transistor 82. Due to the delayed deenergization characteristic of the relays, contacts 16, 26 and 28 are actuated to an energized state before contact pairs 14 and 27 are released to their normal, deenergized state. Consequently, contacts 28 close before contacts 27 open, thereby momentarily connecting both batteries 22 and 24 in parallel to supply power to loads 30. Shortly thereafter, coil 62 is completely deenergized, opening contacts 27 and closing contacts 14 to complete the switching action. At this point, battery 22 is connected to receive charging current from generator 12 and battery 24 is connected to supply power to loads 30. Diode 84 holds the base of transistor 92 at substantially ground potential so that circuit branch 68 cannot be energized. This mode of operation continues until battery 24 is sufficiently discharged so that its terminal voltage falls below the switching voltage. At that point, transistor 82 becomes nonconductive to deenergize coils 64 and 66, and transistor 80 becomes conductive to energize coil 62. Due to the delayed deenergization characteristic of the switches, contact pair 27 closes before contact pair 28 opens. This action operates to momentarily connect both batteries 22 and 24 in parallel to supply power to loads 30. Shortly thereafter, coils 64 and 66 are completely deenergized, closing contact pairs 16 and 26 and opening contact pair 28. The above described switching operation continues as long as engine 10 is running, the switching frequency being a function of the power consumed by electrical loads 30, the state of charge of the battery connected to supply power to the loads 30, and the capacity of the batteries.

It will be appreciated that during the short time period when both batteries 22 and 24 are connected in parallel to supply loads 30, the generator output voltage is also connected to loads 30. If the vehicle is decelerating at that instant, the generator output voltage may be relatively large (18 volts, for example). If the momentary application of such a voltage is objectionable in a particular situation, and a voltage interruption is not objectionable, it may be desired to eliminate contact pair 27. It will also be appreciated that since the duration of the higher applied voltage is very short (about 10 msec), most loads would be unaffected thereby, and very simple overvoltage protection may be provided for the voltage sensitive loads.

When engine 10 is turned off, the contacts assume the normal positions shown in FIGS. 1 and 2 so that battery 22 is connected to supply power to the electrical loads 30. According to the first embodiment, battery 24 is reserved for supplying power to cranking motor 32 when switch 34 is closed, and according to the second embodiment, battery 24 is open-circuited.

In conclusion, the battery charging circuit of this invention operates to reduce the load placed on engine 10 when the vehicle is accelerating and to increase the load when the vehicle is decelerating so as to take advantage of the momentum of the vehicle, while improving its performance under acceleration. Specifically, the power output of generator 12 is increased during conditions of deceleration and decreased during conditions of acceleration. In order to maintain the vehicle storage batteries at an adequate state of charge, the charging voltage under deceleration is increased beyond the voltage normally used in vehicular battery charging circuits. However, switching circuit 60 prevents the application of the higher charging voltage to the electrical loads 30 of the vehicle. A further benefit of switching circuit 60 is that the voltage applied to electrical loads 30 varies only between a range defined by the nominal terminal voltage of storage battery 22 or 24 and the switching voltage of switching circuit 60. That is, charging voltage developed by generator 12 is varied over a wide range (about 13 volts at low vacuum, to about 18 volts at high vacuum), while the voltage applied to electrical loads 30 varies over a relatively narrow range (11.5 volts to 12 volts). Accordingly, the circuits that comprise electrical loads 30 do not consume excessive energy, and they need not be designed to accommodate the wide range of supply voltages normally present in an automotive electrical system.

It will be appreciated that this invention also applies to electric vehicle battery-charging systems wherein the electric generator is mechanically driven by the motion of the vehicle. Although this invention has been described in reference to specific embodiments, further modifications may be made thereto without departing from its spirit and scope.

The embodiments of the invention in which an exclusive property of priviledge is claimed are defined as follows:

1. A vehicular battery charging system comprising:
   first and second storage batteries for supplying power to vehicular electrical loads;
   a source of charging current;
   a bistable switching means for alternatively connecting said storage batteries for charging and discharging, said bistable switching means having a first state wherein said first storage battery is connected to supply power to said electrical loads and said source of charging current is connected to charge said second storage battery, and a second state wherein said second storage battery is connected to supply power to said electrical loads and said source of charging current is connected to charge said first storage battery; and
   means including voltage sensitive elements connected to each of said storage batteries responsive to the voltage of the storage battery that is connected to supply power to said electrical loads for changing the state of said bistable switching means when the voltage of such battery decreases below a reference valve which is independent of the instantaneous terminal voltage of either of said batteries, whereby the voltage supplied to said electrical loads is maintained within a range defined by the nominal terminal voltage of said storage batteries and said reference value.

2. A charge/discharge control system for the storage batteries of a vehicle comprising:
   first and second storage batteries for supplying power to electrical loads of said vehicle;
   a source charging current connected in a manner to charge each of said first and second storage batteries;
   means for connecting said first storage battery to supply power to said electrical loads;
   first switching means actuable to disconnect said source of charging current from said first storage battery when the terminal voltage of said first storage battery exceeds a reference value which is independent of the instantaneous terminal voltage of either of said batteries;
   second switching means actuable to disconnect said source of charging current from said second storage battery, to connect said second storage battery to supply power to said electrical loads, and to disconnect said first storage battery from said electrical loads when the terminal voltage of said second storage battery exceeds said reference value; and
   means responsive to the actuation of said first and second switching means to prevent actuation of the other of said switching means, said first and second switching means thereby forming a bistable switching device wherein said first or second switching means are alternately actuated according to the terminal voltage of the battery connected to supply power to said electrical loads, whereby said first and second storage batteries are alternately connected to said source of charging current or said electrical loads to maintain the voltage supplied to said electrical loads at a value between the reference value and the nominal terminal voltage of said first and second storage batteries.

3. A battery charging system comprising:
   first and second storage batteries for supplying power to vehicular electrical loads;
   an engine-driven source of voltage for charging said storage batteries, and means for controlling the voltage of said source over a wide range as a function of the load of said engine;
   switching means for alternately connecting said storage batteries for charging and discharging, said switching means having a first stage wherein said first storage battery is connected to supply power to said electrical loads and said source of voltage is connected to charge said second storage battery, and a second state wherein said second storage battery is connected to supply power to said electrical loads and said source of voltage is connected to charge said first storage battery;
   means responsive to the terminal voltage of the storage battery connected to supply power to said electrical loads for changing the state of said switching means when said terminal voltage decreases below a reference value whereby the voltage supplied to said electrical loads is maintained within a narrow range defined by the nominal terminal voltage of said storage batteries and said reference value despite the wide range of charging voltage developed by said source of voltage.

4. A battery charging system comprising:
   first and second storage batteries for supplying power to vehicular electrical loads;
   an engine-driven source of voltage for charging said storage batteries, and means for controlling the voltage of said source of voltage over a wide range as a function of the internal vacuum of said engine;
   switching means for alternately connecting said storage batteries for charging and discharging, said switching means having a first state wherein said first storage battery is connected to supply power to said electrical loads and said source of voltage is connected to charge said second storage battery, and a second state wherein said second storage battery is connected to supply power to said electrical loads and said source of voltage is connected to charge said first storage battery;
   means responsive to the terminal voltage of the storage battery connected to supply power to said electrical loads for changing the state of said switching means when said terminal voltage decreases below a reference value whereby the voltage supplied to said electrical loads is maintained within a narrow range defined by the nominal terminal voltage of said storage batteries and said reference value despite the wide range of charging voltage developed by said source of voltage.

5. A charge/discharge control system for the storage batteries of a vehicle comprising:

first and second storage batteries for supplying power to electrical loads of said vehicle;

an engine-driven source of direct current;

switch means having a rest position wherein said source of direct current is connected to charge said first and second storage batteries, and said first storage battery is connected to supply power to said electrical loads;

first electrically actuable means for disconnecting said source of direct current from said first storage battery when (1) said engine is operational and (2) the terminal voltage of said first storage battery exceeds a reference value;

second electrically actuable means for disconnecting said source of direct current from said second storage battery, for connecting said second storage battery to supply power to said electrical loads, and for disconnecting said first storage battery from said electrical loads when (1) said engine is operational and (2) the terminal voltage of said second storage battery exceeds said reference value;

means resposive to the actuation of said first and second electrically actuable means to prevent actuation of the other of said electrically actuable means; and non-electrical means for returning said switch means to said rest position when said engine is not operational or in the event of an electrical power failure, whereby said first and second storage batteries are connected to be charged by said source of direct current and said first storage battery is connected to supply power to said electrical loads despite an electrical failure that prevents actuation of said first and second electrically actuable means.

6. A vehicular battery charging system comprising:

first and second storage batteries for supplying power to vehicular electrical loads;

a source of charging current;

bistable storage battery connection means switchable between a first state wherein said first storage battery is connected to supply power to said electrical loads and said source of charging current is connected to charge said second storage battery, and a second state wherein said second storage battery is connected to supply power to said electrical loads and said source of charging current is connected to charge to said first storage battery; and means responsive to the terminal voltages of said first and second storage batteries for switching the state of said bistable battery connection means when the terminal voltage of the battery connected to supply power to said electrical loads falls below a reference value, the terminal voltage of the storage battery connected to said source of charging current being ineffective for switching the state of said bistable battery connection means so long as such voltage exceeds said reference value, whereby the voltage supplied to said electrical loads is maintained within a range defined by the nominal terminal voltage of said batteries and said reference value.

* * * * *

UNITED STATES PATENT AND TRADEMARK OFFICE
CERTIFICATE OF CORRECTION

PATENT NO. : 4,345,197
DATED : August 17, 1982
INVENTOR(S) : Ellis G. Wheadon; Robert J. Nowakowski It is certified that error appears in the above-identified patent and that said Letters Patent is hereby corrected as shown below:

Column 1, line 30, "furing" should read -- during.

Column 2, line 6, "it" should read -- It --; line 25, "i" should read -- is --; line 56, "numberal" should read -- numeral --.

Column 9, line 18, "of priviledge" should read -- or privilege --; line 24, delete "a" before "bistable"; same line, "alternatively" should read -- alternately --; line 42, "valve" should read -- value --; line 52, after "source" insert -- of --.

Column 10, line 26, "stage" should read -- state --.

Column 12, claim 13 should be added and should read as follows:

7. A motor vehicle electrical system comprising a direct voltage electrical generator having a field winding, said generator driven by the engine of said vehicle, first and second storage batteries for supplying power to vehicular electrical loads, voltage regulating means connected with said field winding of said generator for regulating the direct voltage output of said generator to a desired regulated value, said voltage regulator having a voltage sensing circuit connected to sense the output voltage of said generator, means responsive to the engine load condition for controlling said voltage sensing circuit to thereby vary the regulated direct voltage output of said generator as a function of engine load, said last named means increasing the output voltage of said generator with increasing engine load, switching means for alternately connecting said storage batteries for charging and discharging, said switching means having a first state wherein said first storage battery is connected to supply power to said electrical loads and said source of voltage is connected to charge said second storage

UNITED STATES PATENT AND TRADEMARK OFFICE
CERTIFICATE OF CORRECTION

PATENT NO. : 4,345,197

DATED : August 17, 1982

INVENTOR(S) : Ellis G. Wheadon; Robert J. Nowakowski

It is certified that error appears in the above-identified patent and that said Letters Patent is hereby corrected as shown below:

battery, a second state wherein said second storage battery is connected to supply power to said electrical loads and said source of voltage is connected to charge said first storage battery, and means responsive to the terminal voltage of the storage battery connected to supply power to said electrical loads for changing the state of said switching means when said terminal voltage decreases below a reference value which is independent of the instantaneous terminal voltage of either of said batteries, whereby the voltage supplied to said electrical loads is maintained within a range defined by the nominal terminal voltage of said storage batteries and said reference value.

On the title page, "6 Claims" should read -- 7 Claims --.

Signed and Sealed this

Thirty-first Day of May 1983

[SEAL]

Attest:

DONALD J. QUIGG

Attesting Officer

Acting Commissioner of Patents and Trademarks